United States Patent
Dheap et al.

(10) Patent No.: US 9,208,693 B2
(45) Date of Patent: Dec. 8, 2015

(54) PROVIDING INTELLIGENT INQUIRIES IN QUESTION ANSWER SYSTEMS

(75) Inventors: Vijay Dheap, Durham, NC (US); Nicholas E. Poore, Durham, NC (US); Lee M. Surprenant, Cary, NC (US); Michael D. Whitley, Weddington, NC (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 13/460,065

(22) Filed: Apr. 30, 2012

(65) Prior Publication Data
US 2013/0288219 A1    Oct. 31, 2013

(51) Int. Cl.
*G09B 7/12* (2006.01)

(52) U.S. Cl.
CPC ........................................ *G09B 7/12* (2013.01)

(58) Field of Classification Search
CPC ........ G06F 17/00; G06N 5/00; G06N 99/005; G06N 5/04; G06Q 10/10
USPC ...................................................... 706/45, 62
See application file for complete search history.

(56) References Cited

U.S. PATENT DOCUMENTS

| | | | |
|---|---|---|---|
| 6,272,479 B1 * | 8/2001 | Farry et al. ....................... 706/13 |
| 7,519,529 B1 * | 4/2009 | Horvitz ............................. 704/7 |
| 2001/0053968 A1 * | 12/2001 | Galitsky et al. .................... 704/9 |
| 2004/0107088 A1 * | 6/2004 | Budzinski ........................ 704/10 |
| 2007/0078842 A1 * | 4/2007 | Zola et al. ......................... 707/4 |
| 2007/0094171 A1 * | 4/2007 | Burges et al. .................... 706/16 |
| 2009/0265338 A1 * | 10/2009 | Kraft et al. ........................ 707/5 |
| 2009/0287678 A1 * | 11/2009 | Brown et al. ..................... 707/5 |
| 2009/0288150 A1 * | 11/2009 | Toomim et al. ................... 726/5 |
| 2009/0292687 A1 | 11/2009 | Fan et al. |
| 2010/0191686 A1 * | 7/2010 | Wang et al. ..................... 706/46 |
| 2010/0299139 A1 | 11/2010 | Ferrucci et al. |
| 2011/0078192 A1 * | 3/2011 | Murdock, IV ................ 707/780 |
| 2011/0125734 A1 * | 5/2011 | Duboue et al. ................ 707/723 |

OTHER PUBLICATIONS

Boni et al, "An Analysis of Clarification Dialogue for Question Answering", Proceedings of HLT-NAACL 2003, Main Papers, pp. 48-55, Edmonton, May-Jun. 2003.*

(Continued)

*Primary Examiner* — Jeffrey A Gaffin
*Assistant Examiner* — Ilya Traktovenko
(74) *Attorney, Agent, or Firm* — Terry Carroll; Edell, Shapiro & Finnan, LLC

(57) ABSTRACT

A method, a system and a computer program product for selecting a further inquiry for a user to clarify a request for information from the user. One or more candidate answers to the request for information from the user are determined, and a score value is generated for each of one or more characteristics of each candidate answer, where at least one characteristic is associated with an inquiry for the user to clarify the request for information. A characteristic associated with an inquiry is determined that includes score values providing the greatest potential adjustment for the candidate answers in response to a clarification of the request for information, and the inquiry is selected that is associated with the determined characteristic for presentation to the user.

17 Claims, 2 Drawing Sheets

(56) References Cited

OTHER PUBLICATIONS

Small, "HITIQA: An Interactive Question Answering System a Preliminary Report", MultisumQA '03, Proceedings of the ACI2003 workshop on Multilingual summarization and question answering, vol. 12, pp. 46-53, a 2003 Article.*

Mittal, S.-et al.; "Versatile questiong answering systems; Seeing in synthesis"; New Journal of Intelligent Information & Database Systems; vol. 5, No. 2; pp. 119-142; 2011.

Hang, CC.-et al.; "An assessment framework for disruptive innovation" Foresight, vol. 13, No. 5; pp. 4-13; 2011.

IBM; "A System & Method to Identify Correct Candidates for Question Answering over Structured Knowledge"; http: http://www.ip.com/pubview/IPCOM000180748D; Mar. 16, 2009.

Okumura, S.-et al.; "Session Initiation Protocol (SIP) Usages of the Offer/Answer Model"; http://priorartdatabase.com/IIPCOM/00021000; Aug. 1, 2011.

Dermaku, A., et al., "Heuristic Methods for Hypertree Decompositions", DBAI Technical Report, 32 pages; 2005.

Gelbukh, A., "MICAI 2008: Advances in Artificial Intelligence", Atizapan de Zaragoza, Mexico, Oct. 2008, (8 pages).

* cited by examiner

PROVIDING INTELLIGENT INQUIRIES IN QUESTION ANSWER SYSTEMS

BACKGROUND

1. Technical Field

Present invention embodiments relate to question/answer (QA) systems, and in particular to clarifying content that is requested from a QA system.

2. Discussion of Related Art

Question/Answer (QA) systems are configured to provide possible answers to questions input by a user, where the answers can include content (or links to content in a web based environment) associated with the answers. However, a QA system can become confused by a question input by a user, for example, due to a terse input or a vagueness of a question being asked. In human-to-human interactions, an important part of question answering is the ability of the person answering a question to ask clarifying questions of the original person asking the question.

In a similar manner, advanced QA systems can take advantage of multiple interpretations of a question in order to come up with a broad set of candidate answers. These advanced QA systems can score the candidate answers using a wide variety of confidence-scoring metrics. It is important to provide adequate confidence-scoring metrics in order to properly ascertain the user's intended meaning of the question so as to provide suitable content in answer to the question.

BRIEF SUMMARY

Embodiments of the present invention include a method, a system and a computer program product for selecting a further inquiry for a user to clarify a request for information from the user comprising determining one or more candidate answers to the request for information from the user, generating a score value for each of one or more characteristics of each candidate answer, wherein at least one characteristic is associated with an inquiry for the user to clarify the request for information, determining the characteristic associated with an inquiry and including score values providing the greatest potential adjustment for the candidate answers in response to a clarification of the request for information, and selecting the inquiry associated with the determined characteristic for presentation to the user.

DETAILED DESCRIPTION

Present invention embodiments pertain to Question/Answer (QA) systems in which a user presents a question to a QA system, where the QA system includes a suitable search engine. One or more suitable fact based answers to the question are provided with a reasonable degree of confidence. The most suitable fact based answers are determined by providing one or more queries to the user by the QA system in order to better ascertain the meaning of the user's question. In particular, the QA system determines one or more candidate answers to an initial question or request for information by a user. The QA system generates a score value for each of one or more characteristics of each candidate answer, where at least one characteristic is associated with an inquiry for the user to clarify the question or request for information. The QA system then determines the characteristic associated with an inquiry that includes score values which provide the greatest potential adjustment for the candidate answers in response to a clarification of the request for information, and the inquiry associated with such determined characteristic is presented to the user. This results in a clarification of the question so as to ensure one or more relevant answers are provided by the QA system in response to the question.

Figure 1:
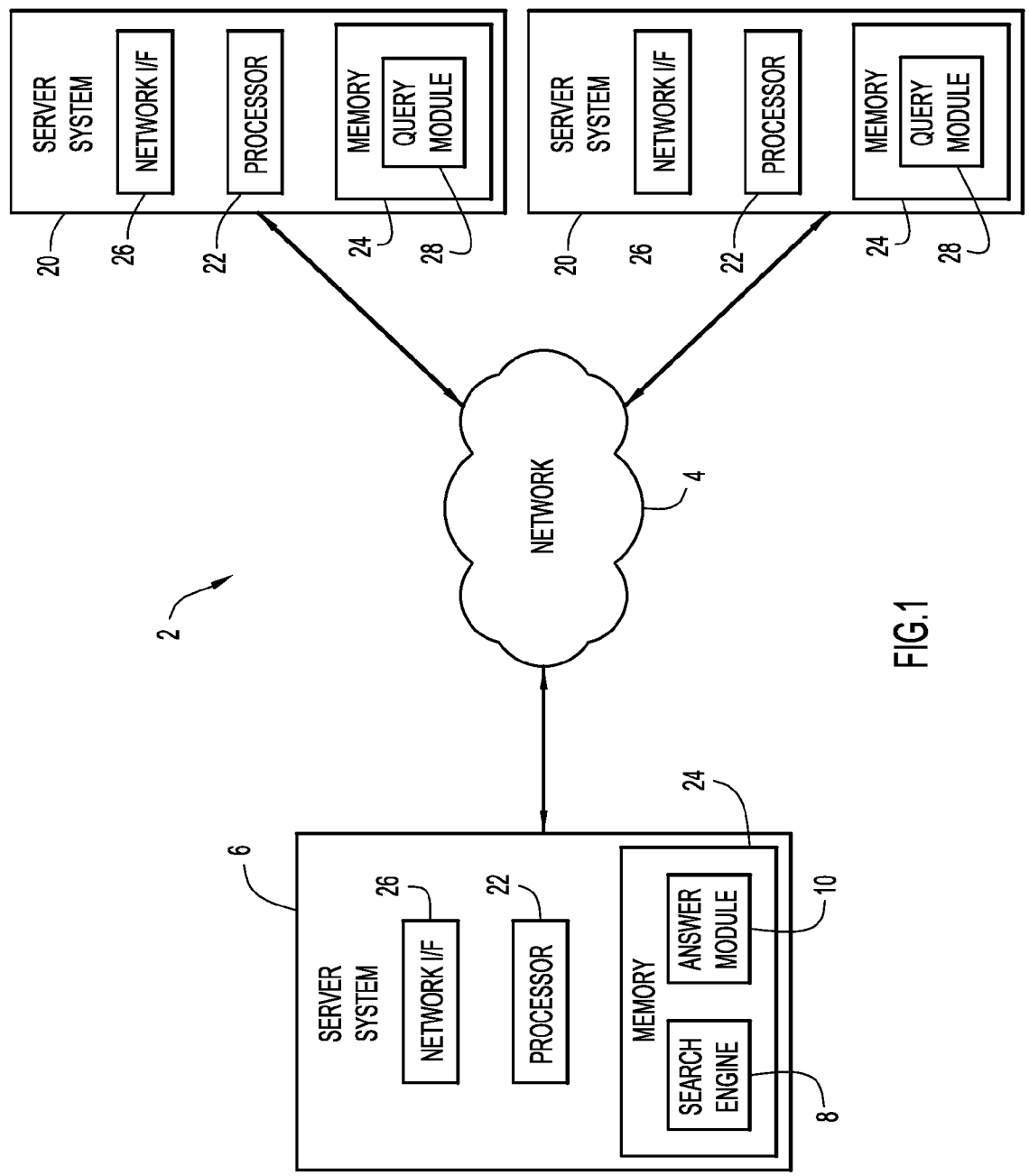
FIG. 1 is a diagrammatic illustration of a computing environment for an embodiment of the present invention.

An example computing environment for use with a QA system is illustrated in FIG. 1. Specifically, the environment 2 includes one or more server systems 6 and one or more client or end-user systems 20. Server systems 2 and client systems 20 may be remote from each other and communicate over a network 4 in which the server systems comprise a central hub from which client systems establish a communication connection. Alternatively, the server systems and client systems may be configured in any other suitable relationship (e.g., in a peer-to-peer or other relationship).

The network 4 can be implemented by any number of any suitable communications media (e.g., wide area network (WAN), local area network (LAN), Internet, Intranet, etc.). Alternatively, server systems 6 and client systems 20 may be local to each other, and communicate via any appropriate local communication medium (e.g., local area network (LAN), hardwire, wireless link, Intranet, etc.).

Server systems 6 include a search engine 8 and an answer module 10. The search engine may be implemented by any conventional or other search engine, and may be distributed across plural computer systems. The search engine 8 is configured to search any one or more databases or other computer systems for content that is related to a question input by a user at a client system.

Client systems 20 enable users to submit questions (e.g., search requests or other queries) to server systems 6 to retrieve search results. For example, the client systems may include a query module 28 (e.g., in the form of a web browser or any other suitable software module) and present any graphical user (e.g., GUI, etc.) or other interface (e.g., command line prompts, menu screens, etc.) to solicit queries from users for submission to one or more server systems 6 and further to display answers/results obtained from the server systems 6 in relation to such queries.

Server systems 6 and client systems 20 may be implemented by any conventional or other computer systems preferably equipped with a display or monitor, a base, where the base includes at least one processor 22, memories 24 and/or internal or external network interface or communications devices 26 (e.g., modem, network cards, etc.), optional input devices (e.g., a keyboard, mouse, or other input device), and any commercially available and custom software (e.g., browser software, communications software, server software, natural language processing software, search engine and/or web crawling software, filter modules for filtering content based upon predefined criteria, etc.). The computer systems may include server, desktop, laptop, and hand-held devices. In addition, the answer module 10 may include one or more modules or units to perform the various functions of present invention embodiments described below (e.g., generating candidate answers, scoring answers, weighting of scored answers, providing suitable clarifying inquiries, etc.), and may be implemented by any combination of any quantity of software and/or hardware modules or units.

A question is input by a client system 20 to a server system 6, and the search engine 8 obtains content associated with the query for processing by the answer module 10 by searching one or more data bases or other computer systems. The answer module generates possible or candidate answers to the query based upon content found by the search engine 8. A manner in which the search engine 8 and answer module 10 process the query and search results (e.g., via server system 6) according to an embodiment of the present invention is illustrated in the flow chart of FIG. 2. Initially, the search engine (e.g., via server system 6) receives a query in the form of a question from a client system 20 at step 50, and generates candidate fact based answers for the query at step 55. As an example, the question presented by the user may be as follows: "Dahlia experienced vibrations when she drove her ABC over 100 mph. Why?" In the examples described herein, the term "Dahlia" is assumed to be a well known automotive manufacturer and/or type of automotive vehicle. In addition, the term "Dahlia" also can be the first name of a person (e.g., in manner similar to the term "Mercedes" being associated with both a type of automobile and also could be a person's first name). The term "ABC" is also assumed in the examples herein as being associated with a well known manufacturer and/or type of automotive vehicle (e.g., analogous to the association of the letters BMW with a well known automotive manufacturer and type of car). These fictitious names for automotive manufacturers and/or automotive vehicles are being provided for example purposes only in relation to demonstrating how the inventive embodiments operate in providing candidate answers to questions. In an example embodiment, the answer module 10 can be configured to first determine whether the query is in fact a question (e.g., the type of question as previous set forth) that can be satisfied by a fact based answer. If the query is instead in another format (e.g., a web-based search request), the answer module 10 can process the query in a different manner (e.g., by compiling search results of hypertext links to websites or other content in a suitable order based upon the query and the results obtained by the search engine 8). The answer module 10 may employ conventional natural language processing techniques to identify questions requiring processing for determining candidate answers associated with the question as well as queries that are in another format (e.g., web-based search requests). Alternatively, the user may specify the type of query to the server system that identifies when the answer module is to be used to generate candidate answers to the question.

The answer module 10 may use any combination of the search results and other resources, and employ any conventional or other techniques for analyzing the query and determining one or more candidate fact based answers. For example, the answer module 10 can be utilized by the processor 22 of a server system 6 to initially parse the question so as to form one or more hypotheses with respect to an answer. The hypotheses are verified against evidence, and are assigned confidence levels. When the confidence level of a hypothesis exceeds a confidence threshold, the answer (corresponding to the hypothesis) is provided. These tasks or functions may be performed based on conventional techniques of natural language processing, semantic analysis, information retrieval, automated reasoning, and machine learning. The answer module may further use various internal and external information sources to understand the query and form and verify hypotheses (e.g., web pages, data caches, databases and/or other storage structures containing indexes, metadata, language rules, dictionaries, thesauri, encyclopaedias, articles, literary works, etc.). By way of example, the answer module may include or communicate with a conventional system (e.g., IBM WATSON system, etc.) employing these types of techniques to ascertain possible or candidate answers.

Alternatively, the answer module 10 can be utilized to determine candidate answer (e.g., via the processor 22 of a server system 10) by leveraging commonalities among search results. In particular, the answer module may analyze the search results, and determine occurrence of common features associated with the content. The answer module may determine the type or form of the answer (e.g., date/day of week, numeric answer, etc.) based on the question provided as input by the user (via client system 20). This may be accomplished by conventional natural language processing, semantic analysis, and other techniques, such as those described above. When common content (e.g., with the determined type or form for the answer) appears at a suitable or threshold frequency in relation to identified portions of the question, the common content is considered to satisfy the query and form the answer. For example, when a question such as "On what day was Thanksgiving in 1990?" is presented, the answer module analyzes search results obtained by the search engine for common content. If the content provides a suitable number of informational items (e.g., content from web sites, from documents within a database or from any other source that is searched by the search engine) with common content (e.g., a threshold number of internet web sites uncovered by the search engine include search results of the date "November 22"), the answer module generates a fact based answer, with reasonable confidence, such as "Thanksgiving Day in 1990 was on November 22".

Other questions by a user may provide a broader range of possible answers, which results in the answer module generating a number of possible or candidate answers. For example, the question "Dahlia experienced vibrations when she drove her ABC over 100 mph. Why?" may generate content that is more wide ranging than the question "On what day was Thanksgiving in 1990?", which would result in a number of candidate answers being generated by the answer module. The answer module is configured to provide a scoring system for the candidate answers in order to determine which answer(s) provide the highest confidence level for suitably answering the question.

In addition, a question such as "Dahlia experienced vibrations when she drove her ABC over 100 mph. Why?" can present an issue for obtaining a suitable answer, since the question by itself may be difficult to properly analyze using the answer module 10 without any further information. While the answer module can determine that the context of the question is in relation to automobiles, it may be unclear whether the word "Dahlia" in the question is referring to a car or to the name of a person. In this scenario, the answer module determines whether any one or more clarifying inquiries to the user are needed to obtain additional information that will be useful in providing one or more candidate answers having a suitable confidence level.

At step 60, a scoring factor for each candidate answer is obtained by scoring each answer based upon a particular characteristic or category and then summing the characteristics or categories to obtain a total scoring factor value. An example embodiment of scoring factor categories that can be used to score candidate answers is now described with reference to the question "Dahlia experienced vibrations when she drove her ABC over 100 mph. Why?". Each scoring factor category can assign a number rating, e.g., between −100 and 100, for the candidate answer based upon the criteria of the scoring factor category. In addition, each scoring factor category can further being given a weighted value, e.g., between 0 and 1. Some examples of scoring factors categories are as follows (other and/or additional scoring factor categories can also be used):

1. Answer Typing—determines how well the answer fits the question
2. Count—how often was a portion of content within the question found in close proximity within content found by the search engine that is used to generate a candidate answer (e.g., how often do "ABC" and "vibrate" appear within the same sentence for content used to generate a candidate answer)
3. Popularity—how frequently was a portion of content within the question found in relation to other content of the question within content found by the search engine that is used to generate a candidate answer (e.g., how often does "vibrate" occur in relation to "ABC" for content used to generate a candidate answer)
4. Health—identifies specific health related content In an example embodiment in which the question "Dahlia experienced vibrations when she drove her ABC over 100 mph. Why?" is presented by a client system 20 to a server system 6, the answer module 10 obtains the following two candidate answers with the highest confidence levels (based upon the scoring factors obtained for the candidate answers):
"ABC vehicles vibrate due to wheel balancing issues"
"Dahlia vehicles vibrate due to their solid-frame design"

Other candidate answers that are possible may be associated with health related issues (e.g., Vibration Syndrome and Raynaud's Syndrome). The scoring factor categories as described above are applied to the candidate answers, where each candidate answer is assigned a score value between −100 and 100 (where this value is assigned based upon how the content associated with obtaining the candidate answer meets certain criteria associated with the particular scoring factor category) and each scoring factor category is assigned a weighted value (from 0 to 1) as follows: Answer Typing is assigned a weighted value of 0.7, Count is assigned a weighted value of 0.3, Popularity is assigned a weighted value of 0.3 and Health is assigned a weighted value of 0.1. These weighted values can be determined based upon a determined relevance of the scoring factor categories with which the weighted values are associated, where the determined relevance for each scoring factor category can be determined based upon certain identified terms in the content of the question presented by the user. For example, utilizing the answer module 10, the analysis associated with generating candidate answers for the question "Dahlia experienced vibrations when she drove her ABC over 100 mph. Why?" may identify key terms to associate the question with a particular topic (e.g., automobiles or vehicles). Thus, in this scenario, a Health weighted value might be assigned a lower value than, e.g., weighted values in the other categories (since health may not have high relevance in relation to the identified topic).

The scoring factor for each candidate answer is determined by multiplying the score value by the weighted value for each scoring factor category and then summing the multiplied values. The Table 1 provided herein shows the example scoring for four candidate answers. It is noted that the number of candidate answers can be greater or fewer and will depend upon a number of factors including, without limitation, the type of analysis utilized by the search engine(s) to obtain content related to the question, the number and types of databases, websites and/or other content sources searched by the search engine(s) to obtain content associated with the question, the type of analysis utilized by the answer module 10 to generate candidate answers, etc.

TABLE 1

Providing Scoring Factors for Candidate Answers

| Candidate Answer | Answer Typing | Count | Popularity | Health | Total |
|---|---|---|---|---|---|
| Dahlia vehicles vibrate due to their solid-frame design | 40 × 0.7 = 28 | 70 × 0.3 = 21 | 30 × 0.3 = 9 | 0 × 0.1 = 0 | 58 |
| ABC vehicles vibrate due to wheel balancing issues | 80 × 0.7 = 56 | 20 × 0.3 = 6 | 10 × 0.3 = 3 | 0 × 0.1 = 0 | 65 |
| Vibration Syndrome | −60 × 0.7 = −42 | 100 × 0.3 = 30 | 50 × 0.3 = 15 | 80 × 0.1 = 8 | 11 |
| Raynaud's Syndrome | −60 × 0.7 = −42 | 50 × 0.3 = 15 | 70 × 0.3 = 21 | 90 × 0.1 = 9 | 3 |

As can be seen from the data in Table 1, the scoring factor for the fact based answer "ABC vehicles vibrate due to wheel balancing issues" has a higher value than the scoring factor for "Dahlia vehicles vibrate due to their solid-frame design". This is due to the Answer Typing category providing a much greater score for the ABC answer than the Dahlia answer. One of the reasons for this is that the analysis in obtaining scoring factors for each candidate answer identified that the term "Dahlia" within the original question might apply to a person or to an automobile. Due to this uncertainty, the Answer Typing category provided a lower score value in the Answer Typing category for the Dahlia answer (a score value of 28) in relation to the score value in the same category for the ABC answer (a score value of 56).

As can further be seen in Table 1, the Vibration Syndrome and Raynaud's Syndrome candidate answers yielded a negative score value for the Answer Typing Category. The assigned negative score value for these two candidate answers can be due to the content of these answers being significantly different from identified terms in the content of the original question, thus indicating that these candidate answers do not fit well with the question. In contrast, the Vibration Syndrome and Raynaud's Syndrome candidate answers have score values in the Health category that are much greater than the score values for the ABC and Dahlia candidate answers (score value for each of these is 0). This is because these two candidate answers relate to a health topic or health content, while the ABC and Dahlia candidate answers do not. However, since the weighted value of the Health category is relatively low (0.1) in relation to the other categories, this category does not negatively skew the overall scoring factor for these candidate answers (i.e., both the Vibration Syndrome and Raynaud's Syndrome candidate answers have overall scoring factor values of 11 and 3, respectively, and these values are considerably lower than the overall scoring factor values of the ABC and Dahlia candidate answers).

At step 65, one or more clarifying questions are generated for selected candidate answers. For example, a clarifying question for a selected candidate answer can be generated based upon the same analysis that is performed to obtain candidate answers based upon content found from the search. In addition, when determining scoring factors associated with candidate answers, the scoring factors can also track assumptions for assessing a confidence indicator associated with a score and then generate a candidate question based on those sets of assumptions. For example, the Dahlia candidate answer can be associated with the following generated clarifying question: "Does Dahlia refer to a person or a car brand?". This clarifying question is generated based upon the recognition by the server system 6, utilizing the answer module 10, that there are multiple possible meanings for terms or phrases within the content of the original question. Other clarifying questions can be generated for other candidate answers based upon the terms and content of the candidate answer and terms or content of the original question that are determined as being unclear based upon the analysis of the question during the generation of candidate answers and/or obtaining scoring factors for the generated candidate answers.

The scoring factor values in each scoring factor category are further weighted at step 70. In an example embodiment, the weighting occurs by taking a weighted reciprocal of the score value for each candidate answer in each scoring category according to the following formula:

Score Weighting=(1/(|score value|/100))×(weighted value)

So, for example, the score weighting for the Dahlia candidate answer in the Answer Typing category is calculated as follows: Score Weighting=(1/(40/100))×0.7=1.75. The score weighting determines the maximum of the weighted reciprocal for each score value in each scoring category as a basis for determining which clarifying question(s) to ask. A calculation of the score weighting values for each candidate answer in each scoring category is provided in Table 2:

TABLE 2

Score Weighting Values for Candidate Answers

| Candidate Answer | Answer Typing | Count | Popularity | Health |
|---|---|---|---|---|
| Dahlia vehicles vibrate due to their solid-frame design | 1.75 | 0.43 | 1 | N/A |
| ABC vehicles vibrate due to wheel balancing issues | 0.875 | 1.5 | 3 | N/A |
| Vibration Syndrome | 1.17 | 0.3 | 0.6 | 0.125 |
| Raynaud's Syndrome | 1.17 | 0.6 | 0.43 | 0.11 |
| Total | 4.96 | 2.83 | 5.03 | 0.23 |

As can be seen from the data in Table 2, the Dahlia candidate answer has the greatest score weighting which is in the Answer Typing category (score weighting value of 1.75). This greatest score weighting value can be used to determine which clarifying question is to be presented to the user at the client system 20. In this scenario, since the Dahlia candidate answer has the overall greatest individual score weighting value (in the Answer Typing category), the clarifying question associated with the Dahlia candidate answer (e.g., "Does Dahlia refer to a person or a car brand?") is selected for presentation to the user.

A total score weighting value for each category is also calculated (by summing the individual score weighting values for each candidate answer in a category). The total score weighting value can also be used as the basis for determining which clarifying answer to select for presentation to the user. However, for some categories, a clarifying question may not be applicable. For example, the Count and Popularity categories do not translate well into providing a clarifying question, so these two categories are flagged by the system as not being available or not applicable (N/A) for a clarifying question. In contrast, the Answer Typing and Health categories are designated suitable categories for generating clarifying questions for selected answer candidates. A clarifying question associated with a candidate answer having the greatest individual score weighting value in a category would be selected from an eligible category having the greatest total score weighting value. The clarifying questions to be used for each scoring category are depicted in Table 3:

TABLE 3

Clarifying Questions Based Upon Category

| | Answer Typing | Count | Popularity | Health |
|---|---|---|---|---|
| Total Score Weighting Value | 4.96 | 2.83 | 5.03 | 0.23 |
| Clarifying Question | Does Dahlia refer to a person or a car brand? | N/A | N/A | Are the vibrations localized to the finger? |

In the Answer Typing category, since the Dahlia candidate answer has the greatest individual score weighting value (1.75), the clarifying question associated with this candidate answer ("Is Dahlia referring to a person or a car brand?") is assigned to this category. In the Health category, the Vibration Syndrome candidate answer has the greatest individual score weighting value (0.125), so the clarifying question associated with this candidate answer ("Are the vibrations localized to the finger?") is assigned to this category. As previously noted, the Count and Popularity categories are not suitable for providing clarifying answers and are thus flagged or designated as not applicable (N/A) for selection of a clarifying question.

In a scenario in which a clarifying question is selected from the category having the greatest total score weighting value, the Popularity category is first chosen utilizing the answer module 10. Since this category is flagged or designated as not applicable (N/A) for providing a clarifying question, the next category having the $2^{nd}$ highest total score weighting value is then chosen. Thus, the chosen clarifying question for presenting to the user is the clarifying question associated with the Dahlia candidate answer in the Answer Typing category as opposed to the clarifying question for the Vibration Syndrome candidate answer in the Health category. An intelligent clarifying question has thus been selected for presentation to the user.

At step 75, a determination is made as to whether one or more candidate answers meet a threshold criteria which indicates the answers have a suitable confidence level for being relevant to the question. For example, a candidate answer can be determined to meet the threshold criteria when its total scoring factor value is at or above a certain threshold value and/or when one or more of its weighted scoring factors are at or above certain threshold values. If one or more candidate answers meet this threshold criteria, an answer comprising the one or more candidate answers is provided at step 90 to the user at a client system 20.

Alternatively, one or more clarifying questions are presented to the user at step 80. The clarifying question(s) is/are presented to the user based upon the generation and analysis of weighted score values at step 70. The user answers the one or more clarifying questions so as to generate a revised query, at step 85, that comprises a question with further information or content that is relevant to the clarifying question(s) presented to the user. The revised query is provided to the server system 6 and candidate answers are then generated or revised based upon the revised query. The process is then repeated a selected number of times until one or more candidate answers meet a threshold criteria (e.g., candidate answers having a total scoring factor value at or above a threshold value) or a maximum number of clarification loops have occurred. The answer, based upon the best one or more candidate answers determined utilizing the answer module 10, is then provided to the user at the client system 20.

Figure 2:
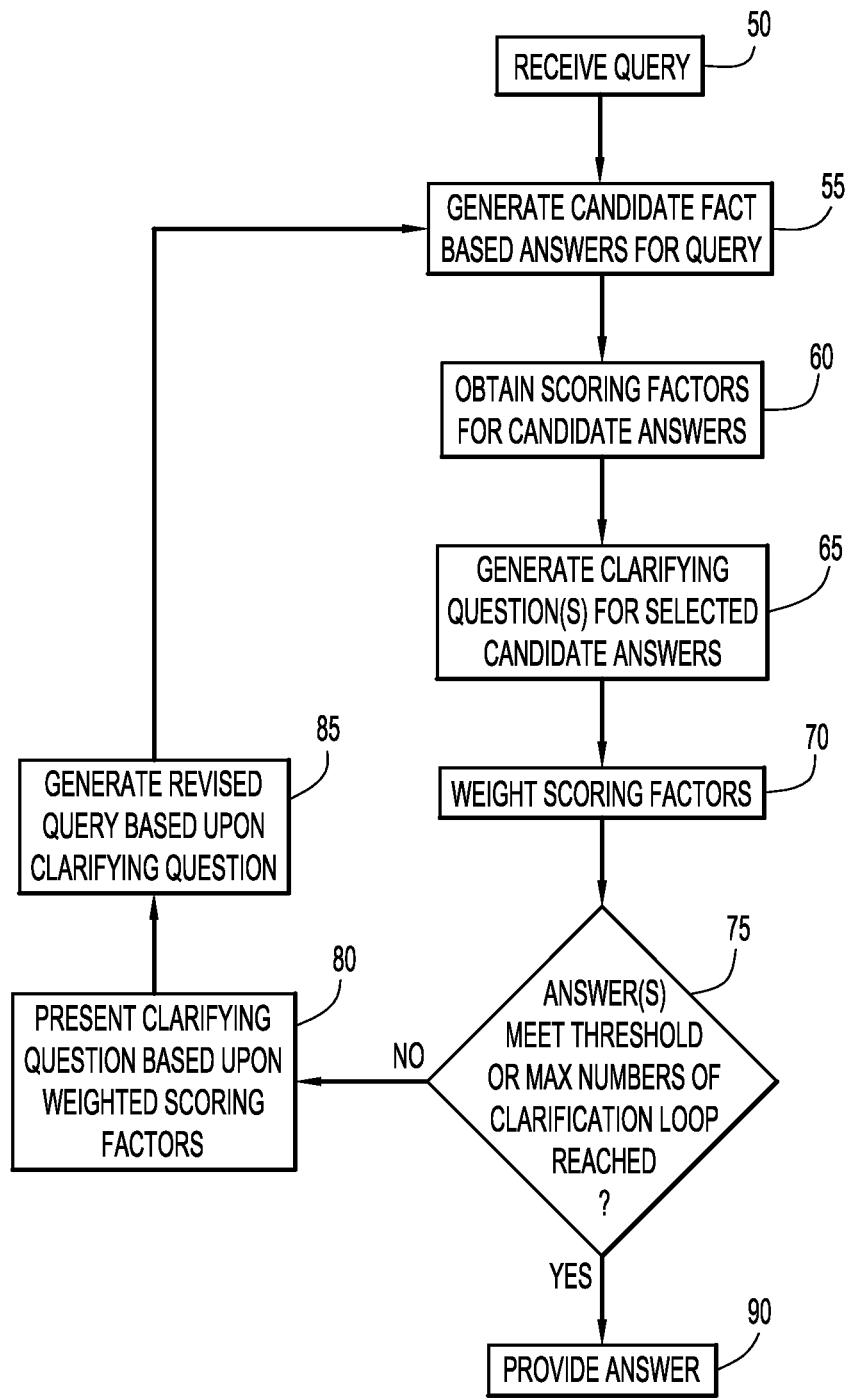
FIG. 2 is a procedural flow chart illustrating an example manner in which search results are filtered according to an embodiment of the present invention.

Utilizing the systems of FIG. 1 with a process as depicted in FIG. 2, an example question "Dahlia experienced vibrations when she drove her ABC over 100 mph. Why?" that includes at least one term with multiple possible meanings (e.g., Dahlia might refer to a vehicle or a person's name), a clarifying question ("Does Dahlia refer to a person or a car brand?") is generated that results in a relevant candidate answer being presented to the user ("Dahlia vehicles vibrate due to their solid-frame design").

Thus, the systems described above result in one or more intelligent clarifying questions being asked, based upon the analysis criteria described herein and depicted in FIG. 2, which helps to provide a fact based answer to a question with a high level of confidence that the answer is relevant to the question. This is particularly useful in scenarios in which questions are initially presented by users that are somewhat vague or ambiguous or include terms that can be interpreted in two or more different ways.

It will be appreciated that the embodiments described above and illustrated in the drawings represent only a few of the many ways of implementing embodiments for providing intelligent clarifying questions or inquiries in QA systems.

The answer module may use any manner of analysis to analyze a fact based inquiry (e.g., language rule sets, language processing, semantic analysis, information retrieval, automated reasoning, machine learning, etc.) and further to determine an answer to a query (e.g. frequency analysis, reliability and fuzzy matching, language processing, semantic analysis, information retrieval, automated reasoning, machine learning, etc.). Further, the answer module may use any combination of information resources (e.g., search results, web pages, data caches, databases, etc.) containing any structured or unstructured data (e.g., indexes, metadata, language rules, dictionaries, thesauri, encyclopedias, articles, literary works, etc.).

The topology or environment of the present invention embodiments may include any number of computer or other processing systems (e.g., client or end-user systems, server systems, etc.) and search engines, databases, or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any commercially available or custom software (e.g., browser software, communications software, server software, natural language processing software, search engine and web crawling software, etc.). These systems may include any types of monitors and input devices (e.g., keyboard, mouse, voice recognition, touch screen, etc.) to enter and/or view information.

It is to be understood that the software (e.g., the answer module and any other suitable modules associated with the search engine or any other components of the systems) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., filter module, question solver module, results editor module, etc.) may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other search engines, databases, data stores or storage structures (e.g., files, databases, data structures, data or other repositories, etc.) to store information (e.g., web pages, caches, indexes, metadata, language rules, dictionaries, thesauri, encyclopedias, articles, literary works, etc.). A database system utilized in the QA systems may be implemented by any number of any conventional or other databases, data stores or storage structures (e.g., files, databases, data structures, data or other repositories, etc.) to store information (e.g., web pages, caches, indexes, metadata, language rules, dictionaries, thesauri, encyclopedias, articles, literary works, etc.). The search engine may be included within or coupled to the server and/or client systems. The search engine data storage structure may be remote from or local to the computer or other processing systems, and may store any desired data (e.g., rules, data to be analyzed, etc.).

Present invention embodiments may be utilized for analyzing any types of data (e.g., alpha numeric text, symbols, markup language, previews, images, waveforms, binary data, etc.) representing any information. Further, present invention embodiments may be utilized for generating answers and clarifying questions utilizing content obtained from any types of sources (e.g., web sites, files, directories, databases, memory devices, data structures, processing devices, various types of stationary or mobile computer or processing systems or devices, etc.).

The present invention embodiments may employ any number of any type of user interface (e.g., Graphical User Interface (GUI), command-line, prompt, etc.) for obtaining or providing information (e.g., obtaining information for the desired query, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The answer module may be implemented by any combination of any quantity of software and/or hardware modules or units, and may reside within memory 24 of the server and client systems for execution by one or more processors 22.

What is claimed is:

1. A computer-implemented method of selecting a clarifying inquiry for a user to clarify a request for information comprising:
   determining a plurality of candidate answers to the request for information from the user, each candidate answer having a corresponding clarifying inquiry, wherein at least one candidate answer has an ambiguous term that is interpreted in two or more different ways and the clarifying inquiry is to ascertain a desired interpretation of the ambiguous term;
   generating a score value for each of one or more characteristics of each candidate answer, wherein at least one characteristic is associated with the clarifying inquiry for the user to clarify the request for information;
   determining a corresponding weighting value for each characteristic;
   determining the characteristic associated with the clarifying inquiry that provides a greatest potential adjustment for the candidate answers in response to a clarification of the request for information, wherein the determined characteristic is based upon a greatest weighted score value associated with the candidate answer comprising the ambiguous term for a respective category of characteristics, and wherein the weighted score value is determined by multiplying a reciprocal of the score value by the corresponding weighting value for a characteristic associated with each candidate answer; and
   selecting the clarifying inquiry associated with the determined characteristic for presentation to the user.

2. The method of claim 1, wherein the weighting value for each characteristic is determined based upon a determined relevance of the characteristic in relation to content associated with the request for information from the user.

3. The method of claim 1, wherein selecting the clarifying inquiry further comprises:
   selecting the clarifying inquiry associated with the candidate answer having the greatest weighted score value for any characteristic.

4. The method of claim 1, wherein selecting the clarifying inquiry further comprises:
   summing weighted score values, wherein the weighted score values are generated based upon score values and corresponding weighting values, associated with each candidate answer for each characteristic; and
   selecting the clarifying inquiry associated with a candidate answer from the characteristic having the greatest sum of weighted score values.

5. The method of claim 1, wherein selecting the further inquiry further comprises:
   indicating that each characteristic is either applicable or not applicable with respect to selecting the clarifying inquiry;
   summing only the weighted score values associated with each candidate answer for each applicable characteristic; and
   selecting the clarifying inquiry associated with a candidate answer from the applicable characteristic having the greatest sum of weighted score values.

6. The method of claim 1, further comprising:
   presenting the selected inquiry to the user;
   receiving information from the user in response to the selected inquiry;
   determining a relevance of the candidate answer having the ambiguous term based upon information provided by the user in response to the selected inquiry; and
   providing candidate answers meeting threshold criteria to the user, and when no candidate answer meet the threshold criteria, repeating the process of selecting a clarifying inquiry until the threshold criteria is met.

7. A system for selecting a clarifying inquiry for a user to clarify a request for information comprising:
   a computing system comprising a memory including a candidate answer module; and
   a processor configured to control operations of the answer module to:
      determine a plurality of candidate answers to the request for information from the user, each candidate answer having a corresponding clarifying inquiry, wherein at least one candidate answer has an ambiguous term that is interpreted in two or more different ways and the clarifying inquiry is to ascertain a desired interpretation of the ambiguous term;

generate a score value for each of one or more characteristics of each candidate answer, wherein at least one characteristic is associated with the clarifying inquiry for the user to clarify the request for information;

determine a corresponding weighting value for each characteristic;

determine the characteristic associated with the clarifying inquiry that provides a greatest potential adjustment for the candidate answers in response to a clarification of the request for information, wherein the determined characteristic is based upon a greatest weighted score value associated with the candidate answer comprising the ambiguous term for a respective category of characteristics, and wherein the weighted score value is determined by multiplying a reciprocal of the score value by the corresponding weighting value for a characteristic associated with each candidate answer; and select the clarifying inquiry associated with the determined characteristic for presentation to the user.

8. The system of claim 7, wherein the processor controls operations of the answer module so as to determine the weighting value for each characteristic based upon a determined relevance of the characteristic in relation to content associated with the request for information from the user.

9. The system of claim 7, wherein the processor controls operations of the answer module to select the clarifying inquiry associated with the candidate answer haying the greatest weighted score value for any characteristic.

10. The system of claim 7, wherein the processor controls operations of the answer module to select the clarifying inquiry by:
summing weighted score values, wherein the weighted score values are generated based upon score values and corresponding weighted values, associated with each candidate answer for each characteristic; and
selecting the clarifying inquiry associated with a candidate answer from the characteristic having the greatest sum of weighted score values.

11. The system of claim 7, wherein the processor controls operations of the answer module to select the clarifying inquiry by:
indicating, that each characteristic is either applicable or not applicable with respect to selecting the clarifying inquiry;
summing only the weighted score values associated with each candidate answer for each applicable characteristic; and
selecting the clarifying inquiry associated with a candidate answer from the applicable characteristic having the greatest sum of weighted score values.

12. A non-transitory computer readable storage device having computer readable program code for selecting a clarifying inquiry for a user to clarify a request for information embodied thereon,
the computer readable program code comprising computer executable instructions configured to:
determine a plurality of candidate answers to the request for information from the user, each candidate answer having a corresponding clarifying inquiry, wherein at least one candidate answer has an ambiguous term that is interpreted in two or more different ways and the clarifying inquiry is to ascertain a desired interpretation of the ambiguous term;
generate a score value for each of one or more characteristics of each candidate answer, wherein at least one characteristic is associated with the clarifying inquiry for the user to clarify the request for information;
determine a corresponding weighting value for each characteristic;
determine the characteristic associated with the clarifying inquiry that provides a greatest potential adjustment for the candidate answers in response to a clarification of the request for information, wherein the determined characteristic is based upon a greatest weighted score value associated with the candidate answer comprising the ambiguous term for a respective category of characteristics, and wherein the weighted score value is determined by multiplying a reciprocal of the score value by the corresponding weighting value for a characteristic associated with each candidate answer; and
select the clarifying inquiry associated with the determined characteristic for presentation to the user.

13. The non-transitory computer readable storage device of claim 12, wherein the weighing value for each characteristic is determined based upon a determined relevance of the characteristic in relation to content associated with the request for information from the user.

14. The non-transitory computer readable storage device of claim 12, wherein the computer readable program code comprises computer executable instructions to select the clarifying inquiry further associated with the candidate answer having the greatest weighted score value for any characteristic.

15. The non-transitory computer readable storage device of claim 12, wherein the computer readable program code comprises computer executable instructions further configured to select the clarifying inquiry by:
summing weighted score values, wherein the weighted score values are generated based upon score values and corresponding weighting values, associated with each candidate answer for each characteristic; and
selecting the clarifying inquiry associated with a candidate answer from the characteristic having the greatest sum of weighted score values.

16. The non-transitory computer readable storage device of claim 12, wherein the computer readable code is configured to select the clarifying inquiry by:
indicating that each characteristic is either applicable or not applicable with respect to selecting the clarifying inquiry;
summing only the weighted score values associated with each candidate answer for each applicable characteristic; and
selecting the clarifying inquiry associated with a candidate answer from the applicable characteristic having the greatest sum of weighted score values.

17. The non-transitory computer readable storage device of claim 12, wherein the computer readable program code comprises computer executable instructions further configured to:
present the selected inquiry to the user; and
determine one or more candidate answers based upon information provided by the user in response to the selected inquiry.

* * * * *